US008402065B2

(12) United States Patent
Karimisetty et al.

(10) Patent No.: US 8,402,065 B2
(45) Date of Patent: Mar. 19, 2013

(54) ELECTRONIC CONTROL BATCH RECORD

(75) Inventors: Srikanth Karimisetty, Austin, TX (US);
Srinivasulu Puri, Irvington, NY (US);
Ranvijay Singh, Andhra Pradesh (IN);
Savita Durgada, Irvington, NY (US)

(73) Assignee: Oracle International Corporation, Redwood Shores, CA (US)

( * ) Notice: Subject to any disclaimer, the term of this patent is extended or adjusted under 35 U.S.C. 154(b) by 558 days.

(21) Appl. No.: 12/151,943

(22) Filed: May 9, 2008

(65) Prior Publication Data

US 2009/0193049 A1 Jul. 30, 2009

Related U.S. Application Data

(60) Provisional application No. 61/023,362, filed on Jan. 24, 2008.

(51) Int. Cl.
*G06F 7/00* (2006.01)
*G06F 17/30* (2006.01)

(52) U.S. Cl. ........ 707/802; 707/803; 707/804; 707/811; 707/812; 718/100; 718/101

(58) Field of Classification Search .......... 707/802–804, 707/811, 812; 718/100, 101
See application file for complete search history.

(56) References Cited

U.S. PATENT DOCUMENTS

| | | | |
|---|---|---|---|
| 6,345,259 B1* | 2/2002 | Sandoval ...................... 705/7.11 |
| 6,898,597 B1* | 5/2005 | Cook et al. ............. 707/999.003 |
| 7,275,062 B2* | 9/2007 | Deitz et al. ....................... 700/17 |
| 2003/0140278 A1* | 7/2003 | Holland et al. .................. 714/25 |
| 2003/0172368 A1 | 9/2003 | Alumbaugh et al. |
| 2004/0128169 A1* | 7/2004 | Lusen ................................ 705/3 |
| 2005/0114763 A1* | 5/2005 | Nonomura et al. ........... 715/513 |
| 2006/0041087 A1* | 2/2006 | Cholli ............................. 526/89 |
| 2007/0027938 A1 | 2/2007 | Clarke |
| 2007/0031451 A1* | 2/2007 | Slifka et al. ................. 424/204.1 |
| 2007/0220065 A1 | 9/2007 | Coyle et al. |
| 2007/0226730 A1 | 9/2007 | Coyle et al. |
| 2008/0066019 A1* | 3/2008 | Worek et al. ................... 715/965 |
| 2008/0091705 A1* | 4/2008 | McBride et al. .............. 707/102 |
| 2008/0201339 A1 | 8/2008 | McGrew et al. |
| 2008/0301171 A1* | 12/2008 | Owen et al. .................... 707/102 |
| 2009/0082894 A1* | 3/2009 | Pettus et al. .................. 700/105 |

OTHER PUBLICATIONS

"Oracle Manufacturing Execution System for Process Manufacturing User's Guide", Oracle, Nov. 2006, pp. 1-136, download: http://download.oracle.com/docs/cd/B34956_01/current/acrobat/120gmomesug.pdf.*

"Guidance for Food Processing/Packaging in Michigan Food Service Establishments", Michigan Department of Agriculture, Jun. 2005, pp. 1-18. download: http://www.michigan.gov/documents/MDA_FS_ProcessingGuideMaster061405_129837_7.pdf.*

US Patent and Trademark Final Office Action in co-pending U.S. Appl. No. 11/151,942, filed May 9, 2008, Notification date Feb. 17, 2011 (27 pages).

US Patent and Trademark Office (USPTO) NonFinal Office Action, having a notification date of Sep. 1, 2010 from related U.S. Appl. No. 12/151,942, filed May 9, 2008 (20 pgs).

(Continued)

*Primary Examiner* — Hares Jami
(74) *Attorney, Agent, or Firm* — Kraguljac Law Group LLC

(57) ABSTRACT

Systems, methods, and other embodiments associated with batch process monitoring are described. One example method may include monitoring an external batch process (e.g. food manufacture, drug manufacture). The method may include collecting data (e.g. material usage, material yield, resource usage, quality results, process parameters, actions performed on batches) from the external batch process. The method may also include generating an XML document based, at least in part, on data collected from the external batch process. The contents of the XML document are to represent a required record that relates to a consumable product manufacturing event. In one example, the record may comply with Title 21 of the United States Code.

10 Claims, 5 Drawing Sheets

OTHER PUBLICATIONS

US Patent and Trademark Final Office Action in U.S. Appl. No. 12/151,942, filed May 9, 2008; Notification Date Oct. 17, 2011 (24 pages).

Oracle Corporation, Oracle Mfg Execution System for Process Mfg, Oracle Data Sheet on oracle.com, Jan. 25, 2007 (copyright is 2006), pp. 1-5, Oracle Corp., Redwood Shores, CA.

Oracle Corporation, Lean and Paperless: The New Records Management, A quarterly e-newsletter for enterprises that use Lean Mfg appls., Feb. 6, pp. 1-2, http://www.oracle.com/newsletters/updates/february-2006/lean-manufacturing/lean-paperless.html, Oracle Corp., Redwood Shores, CA.

* cited by examiner

ELECTRONIC CONTROL BATCH RECORD

CROSS REFERENCE TO RELATED APPLICATIONS

This application claims the benefit of U.S. Provisional Patent Application Ser. No. 61/023,362 filed Jan. 24, 2008, which is incorporated by reference herein in its entirety.

This application is related to the following U.S. patent application, which is assigned to the present assignee:

"TRACKING CHANGES TO A BUSINESS OBJECT", Ser. No. 12/151,942 filed May 9, 2008, inventors: Karimisetty et al.

BACKGROUND

Regulated industries are required by law to maintain records regarding batch manufacturing processes. For example, detailed records are kept for pharmaceutical and food batch manufacturing processes to comply with legal regulations and to maintain a desired level of quality assurance. In some cases, every event that occurs over the course of a batch process may be recorded. Typical records associated with batch processes may include information relating to material usage, material yield, resource usage, quality results, process parameters, actions performed on batches, and so on.

Conventionally, batch processes are monitored by floor operators. Depending on what is being manufactured, some batch processes may run for days or weeks. Floor operators typically collect required information by writing data onto paper forms. Manual data collection for long processes may be expensive and susceptible to data entry error. Furthermore, a result of manual data collection is that data is sorted chronologically. This may make searching for specific events or information difficult and time consuming. An alternative option is to enter data recorded on the paper forms into an electronic database object manually so the data is more accessible. However, data entry is also expensive and time consuming. In either case, a manual process is used to collect the data. Manual processes are prone to error, and in some cases errors in data recording can be expensive.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Figure 1:
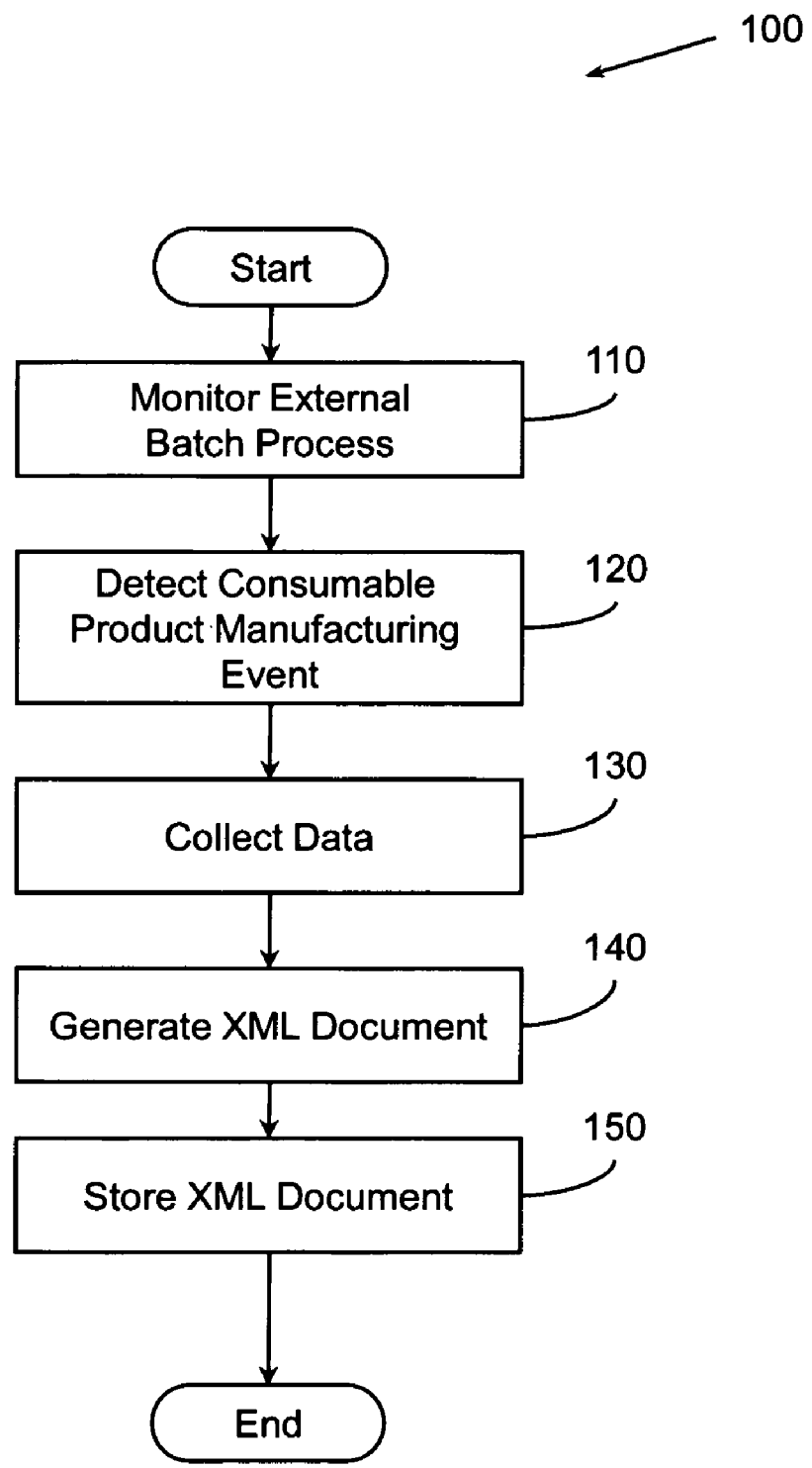
FIG. 1 illustrates an example method associated with monitoring a batch process.

In one example, a system provides a mechanism to create paperless records relating to batch processes. The example system includes a monitor logic to receive signals from an external batch process. In response to receiving an update signal from the external batch process, the monitor logic may provide a generate signal or a manipulate signal to a document logic. The document logic may then generate or manipulate an extensible markup language (XML) document in response to the received signal. The XML document may include data relating to the batch process. This data may include records relating to the batch process that are required by law. This may allow the required information to be collected without intervention from an operator.

In another example, a system may include a configuration logic to facilitate controlling the monitor logic to send the generate signal or the manipulate signal in response to specific update signals. Example systems and methods may eliminate the need for manual data recording over the course of the batch process. This may reduce or eliminate errors related to manual data recording and entry. Additionally, example systems may facilitate keeping more detailed records.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

ASIC: application specific integrated circuit.
CD: compact disk.
CD-R: CD recordable.
CD-RW: CD rewriteable.
DVD: digital versatile disk and/or digital video disk.
HTTP: hypertext transfer protocol.
LAN: local area network.
PCI: peripheral component interconnect.
PCIE: PCI express.
RAM: random access memory.
DRAM: dynamic RAM.
SRAM: synchronous RAM.
ROM: read only memory.
PROM: programmable ROM.
SQL: structured query language.
OQL: object query language.
USB: universal serial bus.
XML: extensible markup language.
WAN: wide area network.

XML refers to extensible markup language. XML is a document format, a meta-markup language for text documents. XML documents are trees that start at a root. XML documents include elements. An element can be defined generically and have a particular instance(s). An instance of an element has "content" (e.g., a value(s)). XML elements can have attributes. An attribute is a name-value pair attached to the element start tag. XML Schemas describe allowed content of XML documents conforming to a particular XML vocabulary.

"Computer component", as used herein, refers to a computer-related entity (e.g., hardware, firmware, software in execution, combinations thereof). Computer components may include, for example, a process running on a processor, a processor, an object, an executable, a thread of execution, and a computer. A computer component(s) may reside within a process and/or thread. A computer component may be localized on one computer and/or may be distributed between multiple computers.

"Computer communication", as used herein, refers to a communication between computing devices (e.g., computer, personal digital assistant, cellular telephone) and can be, for example, a network transfer, a file transfer, an applet transfer, an email, an HTTP transfer, and so on. A computer communication can occur across, for example, a wireless system (e.g., IEEE 802.11), an Ethernet system (e.g., IEEE 802.3), a token ring system (e.g., IEEE 802.5), a LAN, a WAN, a point-to-point system, a circuit switching system, a packet switching system, and so on.

"Computer-readable medium", as used herein, refers to a medium that stores signals, instructions and/or data. A computer-readable medium may take forms, including, but not limited to, non-volatile/non-transitory media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

In some examples, "database" is used to refer to a table. In other examples, "database" may be used to refer to a set of tables. In still other examples, "database" may refer to a set of data stores and methods for accessing and/or manipulating those data stores.

"Data store", as used herein, refers to a physical and/or logical entity that can store data. A data store may be, for example, a database, a table, a file, a list, a queue, a heap, a memory, a register, and so on. In different examples, a data store may reside in one logical and/or physical entity and/or may be distributed between two or more logical and/or physical entities.

"Logic", as used herein, includes but is not limited to hardware, firmware, software in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, software). Logical and/or physical communication channels can be used to create an operable connection.

"Query", as used herein, refers to a semantic construction that facilitates gathering and processing information. A query may be formulated in a database query language (e.g., SQL), an OQL, a natural language, and so on.

"Signal", as used herein, includes but is not limited to, electrical signals, optical signals, analog signals, digital signals, data, computer instructions, processor instructions, messages, a bit, a bit stream, or other means that can be received, transmitted and/or detected.

"Software", as used herein, includes but is not limited to, one or more executable instruction that cause a computer, processor, or other electronic device to perform functions, actions and/or behave in a desired manner. "Software" does not refer to stored instructions being claimed as stored instructions per se (e.g., a program listing). The instructions may be embodied in various forms including routines, algorithms, modules, methods, threads, and/or programs including separate applications or code from dynamically linked libraries.

"User", as used herein, includes but is not limited to one or more persons, software, computers or other devices, or combinations of these.

Some portions of the detailed descriptions that follow are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic, and so on. The physical manipulations create a concrete, tangible, useful, real-world result.

It has proven convenient at times, principally for reasons of common usage, to refer to these signals as bits, values, elements, symbols, characters, terms, numbers, and so on. It should be borne in mind, however, that these and similar terms are to be associated with the appropriate physical quantities and are merely convenient labels applied to these quantities. Unless specifically stated otherwise, it is appreciated that throughout the description, terms including processing, computing, determining, and so on, refer to actions and processes of a computer system, logic, processor, or similar electronic device that manipulates and transforms data represented as physical (electronic) quantities.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

FIG. 1 illustrates a method 100 associated with monitoring a batch process. Method 100 may include, at 110, monitoring an external batch process. The batch process may be, for example, associated with food manufacture or drug manufacture. Method 100 may also include, at 120, detecting an occurrence of a consumable product manufacturing event (CPME) performed by the external batch process. Recording information associated with the CPME may be required. In one example, the information to be recorded may be required by law. In another example, the information to be recorded may be required by the company performing the batch process to maintain a level quality assurance. In the United States, some batch processes may keep legally mandated records that comply with Title 21 of the United States Code (USC). For example, a batch process relating to food manufacture may keep legally mandated records that comply with Title 21 USC §110. A batch process relating to drug manufacture may keep legally mandated records that comply with Title 21 USC §211. In another example, some CPMEs may not require information recording. Therefore, method 100 may selectively detect specific pre-determined CPMEs.

Method 100 may also include, at 130, collecting data from the external batch process. The data may include information to be included in the required record. Data collected may include information relating to material usage, material yield, resource usage, quality results, process parameters, actions performed on batches, and so on. The data may be collected into a control batch record. The data may also be collected into a database object. Method 100 may also include, at 140, generating an extensible markup language (XML) document. The XML document may include data representing a state of the external batch process. The XML document may also include information relating to the required record. Method 100 may also include, at 150, storing the XML document in a computer-readable medium. Storing the XML document may facilitate retrieving data stored in the XML document at a later time.

While FIG. 1 illustrates various actions occurring in serial, it is to be appreciated that various actions illustrated in FIG. 1 could occur substantially in parallel. By way of illustration, a first process could detect CPMEs, a second process could collect data related to the CPMEs, and a third process could generate XML documents. While three processes are described, it is to be appreciated that a greater and/or lesser number of processes could be employed and that lightweight processes, regular processes, threads, and other approaches could be employed.

In one example, a method may be implemented as computer executable instructions. Thus, in one example, a computer-readable medium may store computer executable instructions that if executed by a machine (e.g., processor) cause the machine to perform a method that includes collecting data relating to an external batch process. While executable instructions associated with the above method are described as being stored on a computer-readable medium, it is to be appreciated that executable instructions associated with other example methods described herein may also be stored on a computer-readable medium.

Figure 2:
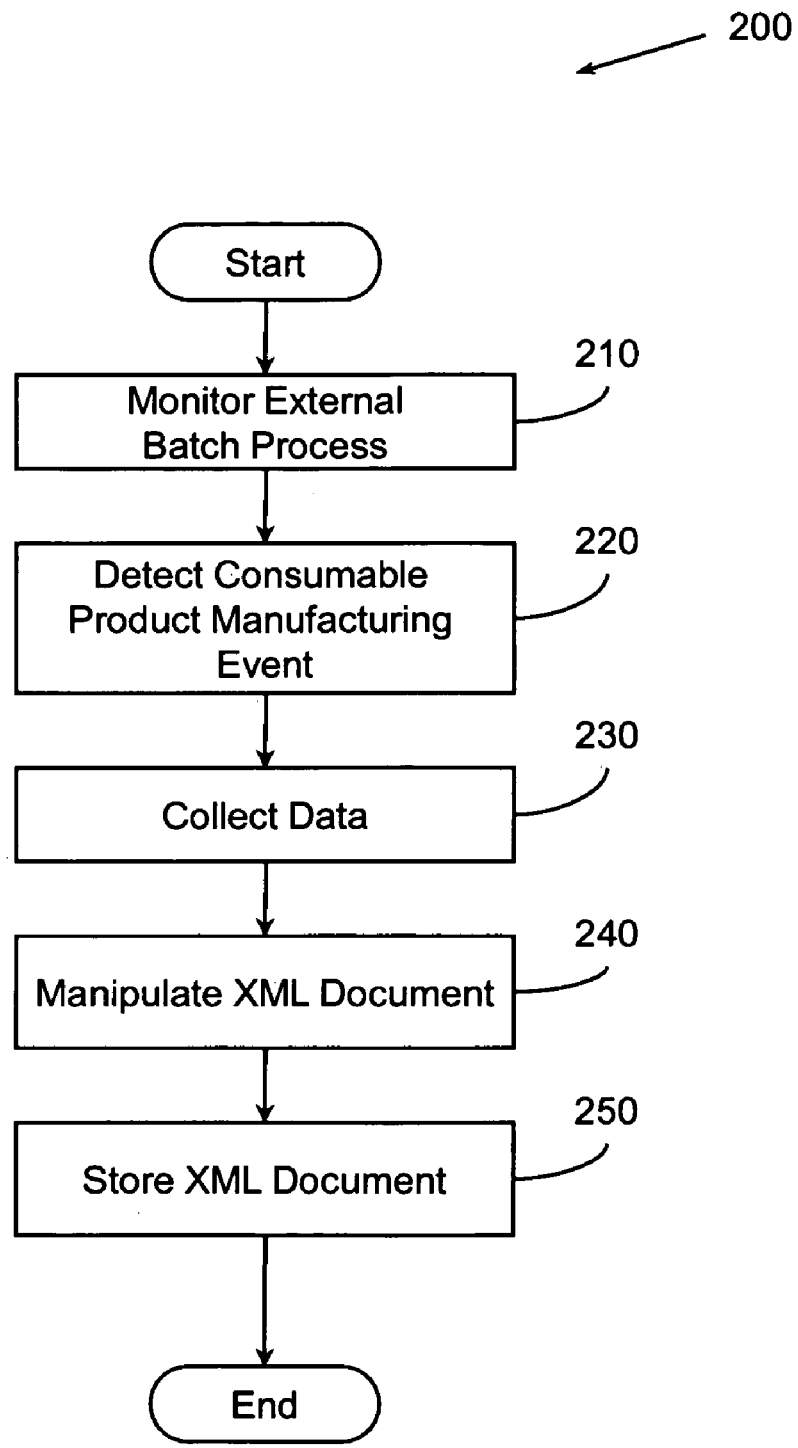
FIG. 2 illustrates an example method associated with monitoring a batch process.

FIG. 2 illustrates a method 200 associated with monitoring a batch process. Method 200 includes several items similar to those described in connection with method 100 (FIG. 1). For example, method 200 includes monitoring an external batch process at 210, detecting a consumable product manufacturing event (CPME) at 220, and collecting data at 230. However, method 200 may include differing actions.

Method 200 may include, at 240, manipulating an XML document. Manipulating an XML document may include appending information from data collected at 230 to the XML document. The information appended to the XML document may include information relating to a required record. In one example, the information to be recorded may be required by law. In another example, the information to be recorded may be required by the company performing the batch process to maintain a level quality assurance. In the United States, some batch processes may keep legally mandated records that comply with Title 21 of the United States Code (USC). For example, a batch process relating to food manufacture may keep legally mandated records that comply with Title 21 USC §110. A batch process relating to drug manufacture may keep legally mandated records that comply with Title 21 USC §211. In another example, some CPMEs may not require information recording. Therefore, method 200 may selectively detect specific pre-determined CPMEs. Method 200 may also include, at 250, storing the XML document to a computer-readable medium.

Figure 3:
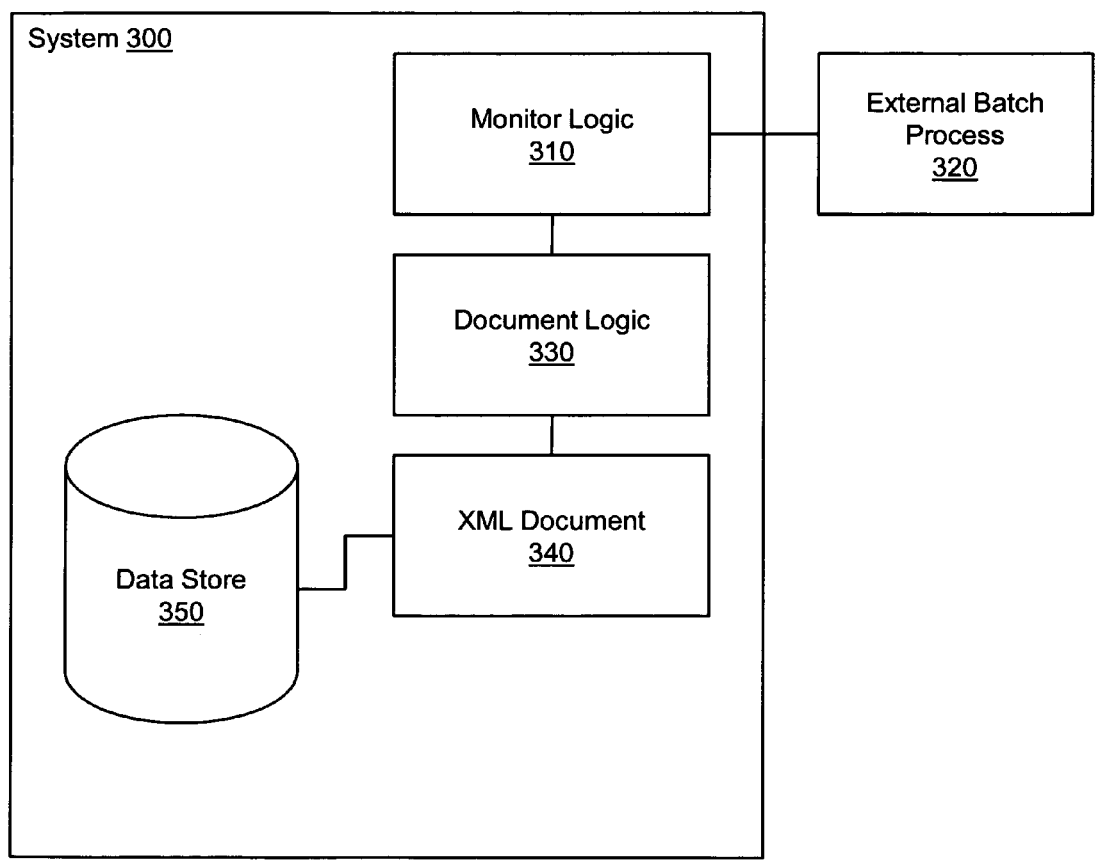
FIG. 3 illustrates an example system associated with monitoring a batch process.

FIG. 3 illustrates a system 300 associated with monitoring a batch process. System 300 may include a monitor logic 310. Monitor logic 310 may be configured to receive an update signal from an external batch process 320. The update signal may be provided in response to the occurrence of a CPME for which a record is required. The CPME may be associated with the external batch process. As described above, records may be required by law or by company standards.

System 300 may also include a document logic 330. In one example, document logic 330 may generate an XML document 340. Document logic 330 may generate XML document 340 in response to receiving a generate signal from monitor logic 310. XML document 340 may be based on information contained in the update signal. XML document 340 may also be based on data associated with external batch process 320. The data associated with external batch process 320 may include information to be included in the required record. The information to be included in the required record may include data that relates to material usage, material yield, resource usage, quality results, process parameters, actions performed on batches, and so on.

For example, a food product may be manufactured by forming a first compound, composed of multiple ingredients, into a specific shape. The first compound may then be baked in an oven at a specific temperature. The now shaped and baked first compound may then be combined with a second compound, also composed of multiple ingredients, to create a final product. The final product may then be packaged and then shipped. Through the course of the production of the final product, the company manufacturing the product may maintain records relating to the variation in the temperature of the oven, the quantities of the first and second compounds, the number of the final product in each package, and so forth. The company may maintain these records to ensure an appropriate level of quality in the final product. The company may also maintain these records to comply with federal regulations.

In another example, document logic 330 may manipulate an XML document 340 in response to receiving a manipulate signal from monitor logic 310. Manipulating XML document 340 may include appending information to XML document 340. Information appended to the XML document may be related to the update signal. Information appended to the XML document may also be related to data associated with external batch process 320. Information appended to the XML document may include information to be included in the required record. Information to be included in the required record may include data that relates to material usage, material yield, resource usage, quality results, process parameters, actions performed on batches, and so on. System 300 may also include a data store 350 to store XML document 340. Storing XML document 340 may facilitate retrieving data stored in XML document 340 at a later time.

Figure 4:
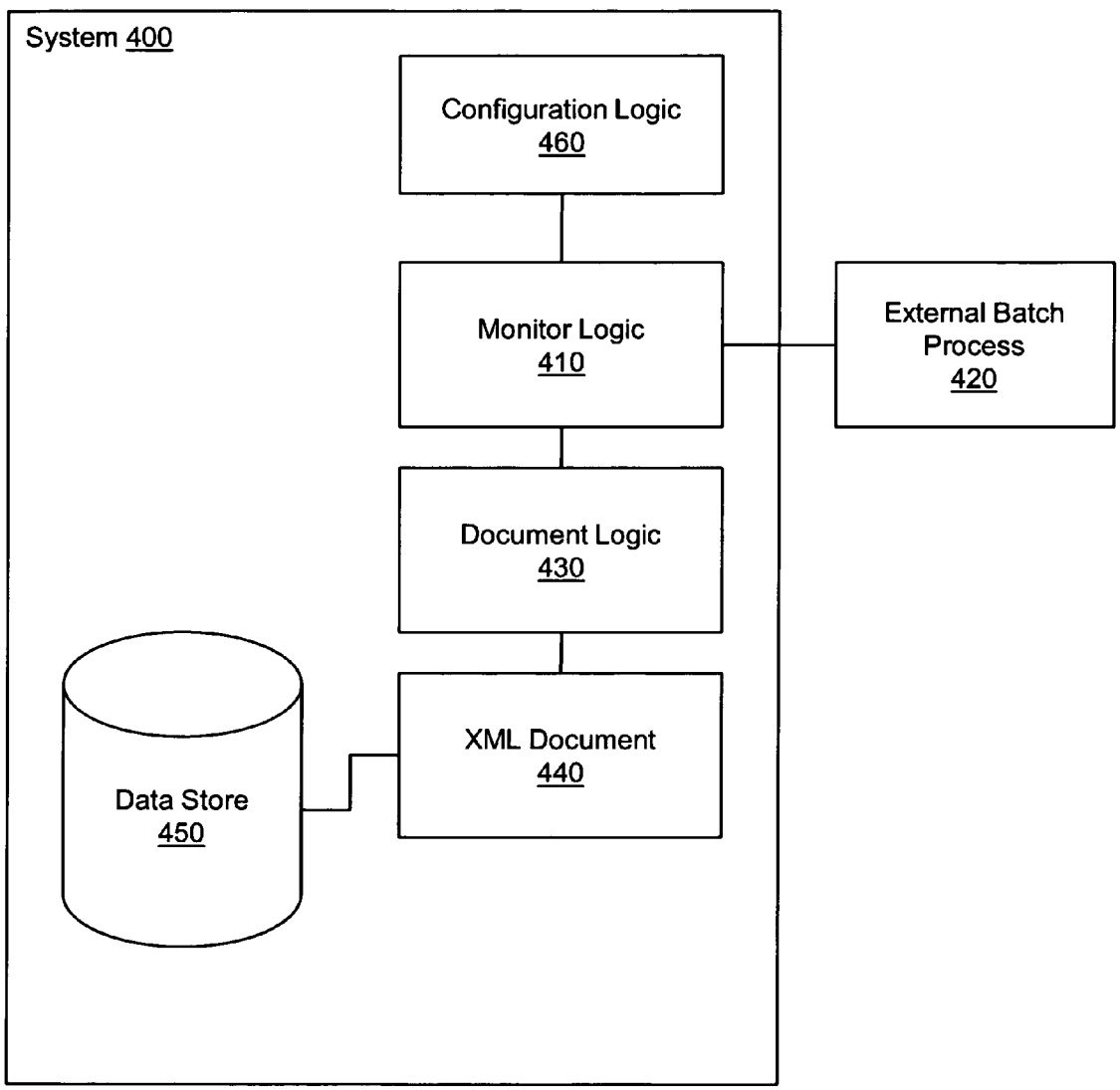
FIG. 4 illustrates an example system associated with monitoring a batch process.

FIG. 4 illustrates a system 400 associated with monitoring a batch process. System 400 includes several items similar to those described in connection with system 300 (FIG. 3). For example, system 400 includes a monitor logic 410 to monitor an external batch process 420, a document logic 430 to generate and/or manipulate an XML document 440, and a data store 450. However, system 400 may include additional elements.

System 400 may also include a configuration logic 460. Configuration logic 460 may configure monitor logic 410 to selectively send a generate signal and/or a manipulate signal in response to detecting the occurrence of a member of a desired set of CPMEs. Configuration logic 460 may also facilitate modifying the desired set of CPMEs. A CPME may include, a start or finish of an oven cycle, a movement of a product from one stage of the batch process to another, a time it takes for a product to acquire a pre-determined quality, and so on. A pre-determined quality may include a density, a color, a weight, a temperature, a size, and so on.

Figure 5:
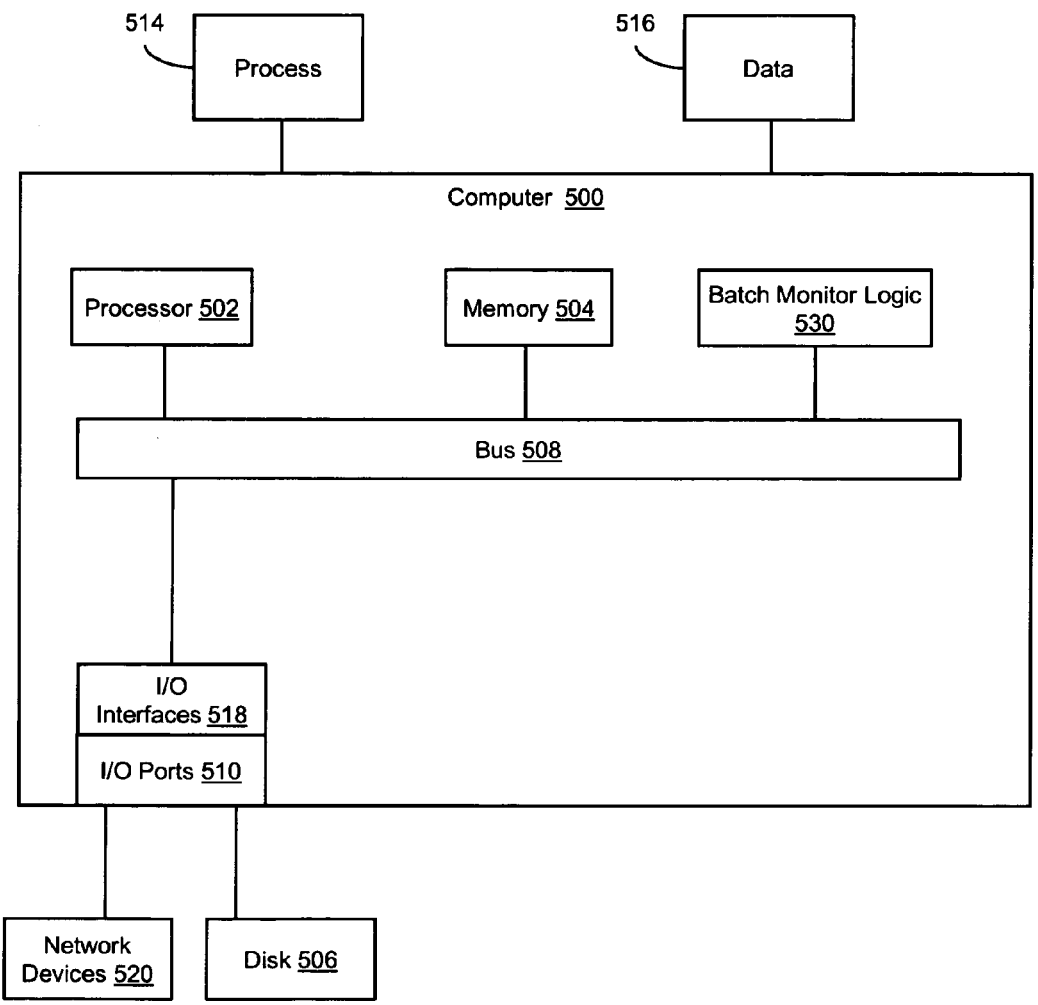
FIG. 5 illustrates an example computing environment in which example systems and methods, and equivalents, may operate.

FIG. 5 illustrates an example computing device in which example systems and methods described herein, and equivalents, may operate. The example computing device may be a computer 500 that includes a processor 502, a memory 504, and input/output ports 510 operably connected by a bus 508. In one example, the computer 500 may include a batch monitor logic 530 configured to facilitate generating records relating to a batch process. In different examples, the logic 530 may be implemented in hardware, software, firmware, and/or combinations thereof. While the logic 530 is illustrated as a hardware component attached to the bus 508, it is to be appreciated that in one example, the logic 530 could be implemented in the processor 502.

Thus, logic 530 may provide means (e.g., hardware, software, firmware) for detecting an occurrence of a CPME for which a record is required. The CPME may be associated with an external batch process. Logic 530 may also provide means (e.g., hardware, software, firmware) for collecting data from the external batch process. The data may include information to be included in the required record. Logic 530 may also provide means (e.g., hardware, software, firmware) for generating an XML record based on the data collected from the external batch process. The XML record may include information relating to the required record. Logic 530 may also provide means (e.g., hardware, software, firmware) for storing the XML record. The means associated with logic 530 may be implemented, for example, as an ASIC. The means may also be implemented as computer executable instructions that are presented to computer 500 as data 516 that are temporarily stored in memory 504 and then executed by processor 502.

Generally describing an example configuration of the computer 500, the processor 502 may be a variety of various processors including dual microprocessor and other multiprocessor architectures. A memory 504 may include volatile memory and/or non-volatile memory. Non-volatile memory may include, for example, ROM, PROM, and so on. Volatile memory may include, for example, RAM, SRAM, DRAM, and so on.

A disk 506 may be operably connected to the computer 500 via, for example, an input/output interface (e.g., card, device) 518 and an input/output port 510. The disk 506 may be, for example, a magnetic disk drive, a solid state disk drive, a floppy disk drive, a tape drive, a Zip drive, a flash memory card, a memory stick, and so on. Furthermore, the disk 506 may be a CD-ROM drive, a CD-R drive, a CD-RW drive, a DVD ROM, and so on. The memory 504 can store a process 514 and/or a data 516, for example. The disk 506 and/or the memory 504 can store an operating system that controls and allocates resources of the computer 500.

The bus 508 may be a single internal bus interconnect architecture and/or other bus or mesh architectures. While a single bus is illustrated, it is to be appreciated that the computer 500 may communicate with various devices, logics, and peripherals using other busses (e.g., PCIE, 1394, USB, Ethernet). The bus 508 can be types including, for example, a memory bus, a memory controller, a peripheral bus, an external bus, a crossbar switch, and/or a local bus.

The computer 500 may interact with input/output devices via the i/o interfaces 518 and the input/output ports 510. Input/output devices may be, for example, a keyboard, a microphone, a pointing and selection device, cameras, video cards, displays, the disk 506, the network devices 520, and so on. The input/output ports 510 may include, for example, serial ports, parallel ports, and USB ports.

The computer 500 can operate in a network environment and thus may be connected to the network devices 520 via the i/o interfaces 518, and/or the i/o ports 510. Through the network devices 520, the computer 500 may interact with a network. Through the network, the computer 500 may be logically connected to remote computers. Networks with which the computer 500 may interact include, but are not limited to, a LAN, a WAN, and other networks.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is employed herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be employed.

What is claimed is:

1. A non-transitory computer-readable medium storing computer-executable instructions that when executed by a computer cause the computer to perform a method, the method comprising:
monitoring an external batch process to detect an occurrence of a consumable product manufacturing event (CPME), the CPME being associated with the external batch process;
in response to detecting the occurrence of the CPME, selectively collecting a set of data from the external batch process upon determining that the CPME matches an event that is specified in a list of events to be recorded, where the set of data includes information to be included about the occurrence of the CPME, wherein recording the CPME is required by a company policy to maintain a level of quality assurance when the CPME matches an event in the list of events, and where the set of data is not collected when the CPME is an event that does not match an event in the list; and
generating an extensible markup language (XML) document from the set of data, where the XML document stores data representing a state of the external batch process, where the XML document is generated to include information relating to the set of data, where generating the XML document occurs for a first event that is recorded from the batch process and subsequent events that are recorded are appended to the XML document; and
storing the XML document in a computer-readable medium; and
modifying the list of events to include the CPME in response to determining that the occurrence of the CPME is an event to be recorded.

2. The non-transitory computer-readable medium of claim 1, where the method includes selectively detecting pre-determined specific CPMEs.

3. The non-transitory computer-readable medium of claim 1, where the data from the external batch process is collected into one or more of, a control batch record, and a database object.

4. The non-transitory computer-readable medium of claim 3, where the data collected from the external batch process relates to one or more of, material usage, material yield, resource usage, quality results, process parameters, and actions performed on batches.

5. The non-transitory computer-readable medium of claim 1, where the set of data is a legally mandated record.

6. A non-transitory computer-readable medium storing computer-executable instructions that when executed by a computer cause the computer to perform a method, the method comprising:
monitoring an external batch process to detect an occurrence of a consumable product manufacturing event (CPME), the CPME being associated with the external batch process;
in response to detecting the occurrence of the CPME, selectively collecting a set of data from the external batch process upon determining that the CPME matches an event that is specified in a pre-generated list of events to be recorded, where the set of data includes information to be included about the occurrence of the CPME, wherein recording the CPME is required by a company policy to maintain a level of quality assurance when the CPME matches an event in the list of events, and where the set of data is not collected when the CPME is an event that does not match an event in the pre-generated list; and
manipulating an extensible markup language (XML) document, where the manipulating includes appending information from the set of data to the XML document, and where the XML document is modified to include information relating to the set of data;
storing the XML document in a computer-readable medium; and
modifying the pre-generated list of events to include the CPME in response to determining the occurrence of the CPME is an event that is to be recorded and is not in the pre-generated list of events.

7. A system, comprising:
a processor;
a monitor logic configured to control the processor to monitor an external batch process for an event and to determine whether the event matches an event in a set of consumable product manufacturing events (CPMEs) that are to be recorded as required by a company policy to maintain a level of quality assurance, where data for the event is not recorded if the event does not match a CPME in the set of CPMEs;
a non-transitory computer-readable medium comprising document logic configured to manipulate an extensible markup language (XML) document in response to a manipulate signal from the monitor logic, where the manipulating includes appending the data for the event to the XML document; and
a non-transitory memory configured to store the XML document; and
a configuration logic configured to modify the set of CPMEs to include the event when the event is an event that requires recording.

8. The system of claim 7, where the CPME is one or more of, a start of an oven cycle, a finish of an oven cycle, a movement of a product from one stage of the external batch process to another, and a time it takes for a product to acquire a pre-determined quality.

9. A computer-implemented method, comprising:
monitoring, using at least one processor, an external batch process for an event and to determine whether the event matches an event in a set of consumable product manufacturing events (CPMEs) that are to be recorded as required by a company policy to maintain a level of quality assurance, wherein data for the event is not recorded if the event does not match a CPME in the set of CPMEs;
manipulating, using the at least one processor, an extensible markup language (XML) document in response to a manipulate signal from the monitor logic, where the manipulating includes appending the data for the event to the XML document; and
storing, using the at least one processor, the XML document in a non-transitory computer-readable medium; and
modifying, using the at least one processor, the set of CPMEs to include the event when the event is an event that requires recording.

10. A non-transitory computer-readable medium storing computer-executable instructions that when executed by a computer including at least one processor cause the computer to perform a method, the method comprising:
monitoring, using the at least one processor, an external batch process for an event and to determine whether the event matches an event in a set of consumable product manufacturing events (CPMEs) that are to be recorded as required by a company policy to maintain a level of quality assurance, wherein data for the event is not recorded if the event does not match a CPME in the set of CPMEs;

manipulating, using the at least one processor, an extensible markup language (XML) document in response to a manipulate signal from the monitor logic, where the manipulating includes appending the data for the event to the XML document; and storing, using the at least one processor, the XML document in a non-transitory computer-readable medium; and modifying, using the at least one processor, the set of CPMEs to include the event when the event is an event that requires recording.

* * * * *